US007145602B2

(12) United States Patent
Shiga

(10) Patent No.: US 7,145,602 B2
(45) Date of Patent: Dec. 5, 2006

(54) EXPOSURE CONTROL METHOD FOR DIGITAL CAMERA

(75) Inventor: Akira Shiga, Kanagawa (JP)

(73) Assignee: Sony Corporation, Tokyo (JP)

( * ) Notice: Subject to any disclaimer, the term of this patent is extended or adjusted under 35 U.S.C. 154(b) by 830 days.

(21) Appl. No.: 10/362,335

(22) PCT Filed: Jun. 20, 2002

(86) PCT No.: PCT/JP02/06165

§ 371 (c)(1),
(2), (4) Date: Feb. 20, 2003

(87) PCT Pub. No.: WO03/001795

PCT Pub. Date: Jan. 3, 2003

(65) Prior Publication Data

US 2003/0179311 A1  Sep. 25, 2003

(30) Foreign Application Priority Data

Jun. 22, 2001 (JP) ............................ 2001-190233

(51) Int. Cl.
H04N 5/235 (2006.01)
H04N 5/222 (2006.01)
H04N 5/232 (2006.01)
G03B 13/00 (2006.01)
G03B 9/70 (2006.01)

(52) U.S. Cl. ...................... 348/362; 348/349; 348/370; 348/229.1; 396/106; 396/166

(58) Field of Classification Search ............... 348/364, 348/349, 370
See application file for complete search history.

(56) References Cited

U.S. PATENT DOCUMENTS

| 5,448,331 | A | * | 9/1995 | Hamada et al. ............. 396/106 |
| 5,486,861 | A | * | 1/1996 | Miyamoto et al. .......... 348/362 |
| 6,195,127 | B1 | * | 2/2001 | Sugimoto .................... 348/370 |
| 6,700,614 | B1 | * | 3/2004 | Hata ........................... 348/345 |

(Continued)

FOREIGN PATENT DOCUMENTS

JP  6-90397  3/1994

(Continued)

OTHER PUBLICATIONS

Patent Abstracts of Japan, vol. 1999, No. 08, Jun. 30, 1999 & JP 11 064723 A (Canon Inc), Mar. 5, 1999.

Primary Examiner—David Ometz
Assistant Examiner—Nhan T. Tran
(74) Attorney, Agent, or Firm—Frommer Lawrence & Haug LLP; William S. Frommer

(57) ABSTRACT

An apparatus and method for controlling exposure of a digital camera with high precision by setting a proper exposure amount by emitting auxiliary light during autofocusing, detecting the luminance level of an object, and carrying out an exposure controlling operation. The apparatus detects the luminance level of an object in an AE frame under the outside light prior to emitting the auxiliary light, and detects again the luminance level of the object in an AF frame under the auxiliary light after emitting the auxiliary light. The apparatus further performs an exposure controlling operation based on the luminance level in the AE frame when it has been determined that the exposure amount of the AF frame has increased markedly in a determining step, or based on the luminance level in the AF frame when it has been determined that the exposure amount of the AF frame has not increased markedly in the determining step.

6 Claims, 3 Drawing Sheets

U.S. PATENT DOCUMENTS

| | | | |
|---|---|---|---|
| 6,700,619 B1* | 3/2004 | Hamamura | 348/370 |
| 6,704,054 B1* | 3/2004 | Hashimoto | 348/354 |
| 6,961,093 B1* | 11/2005 | Higuchi | 348/229.1 |
| 7,071,987 B1* | 7/2006 | Tanaka | 348/362 |
| 2003/0030740 A1* | 2/2003 | Tsujino | 348/333.01 |
| 2004/0095504 A1 | 5/2004 | Hitoshi | |

FOREIGN PATENT DOCUMENTS

| | | |
|---|---|---|
| JP | 6-175190 | 6/1994 |
| JP | 2000-267151 | 9/2000 |

* cited by examiner

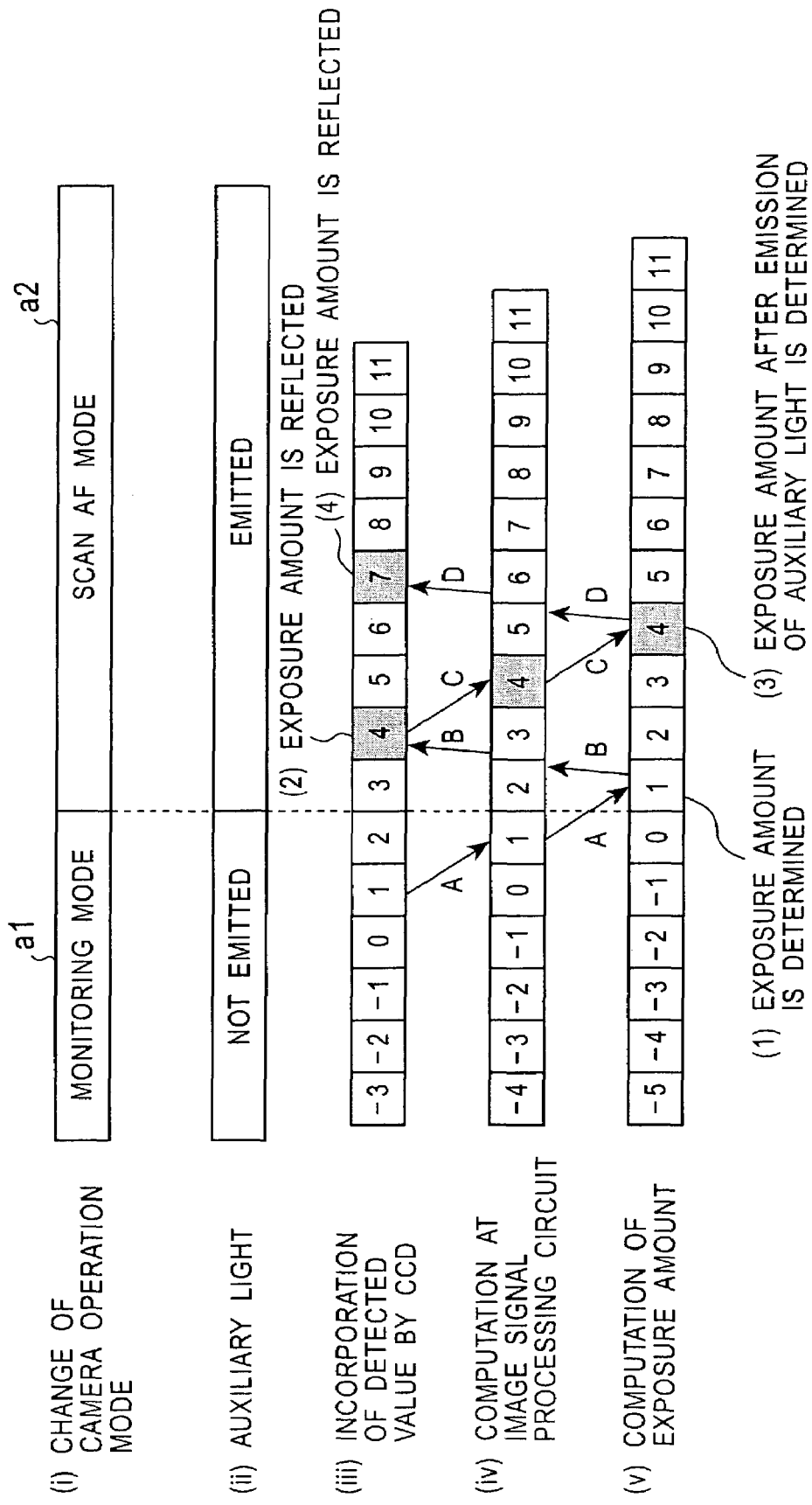

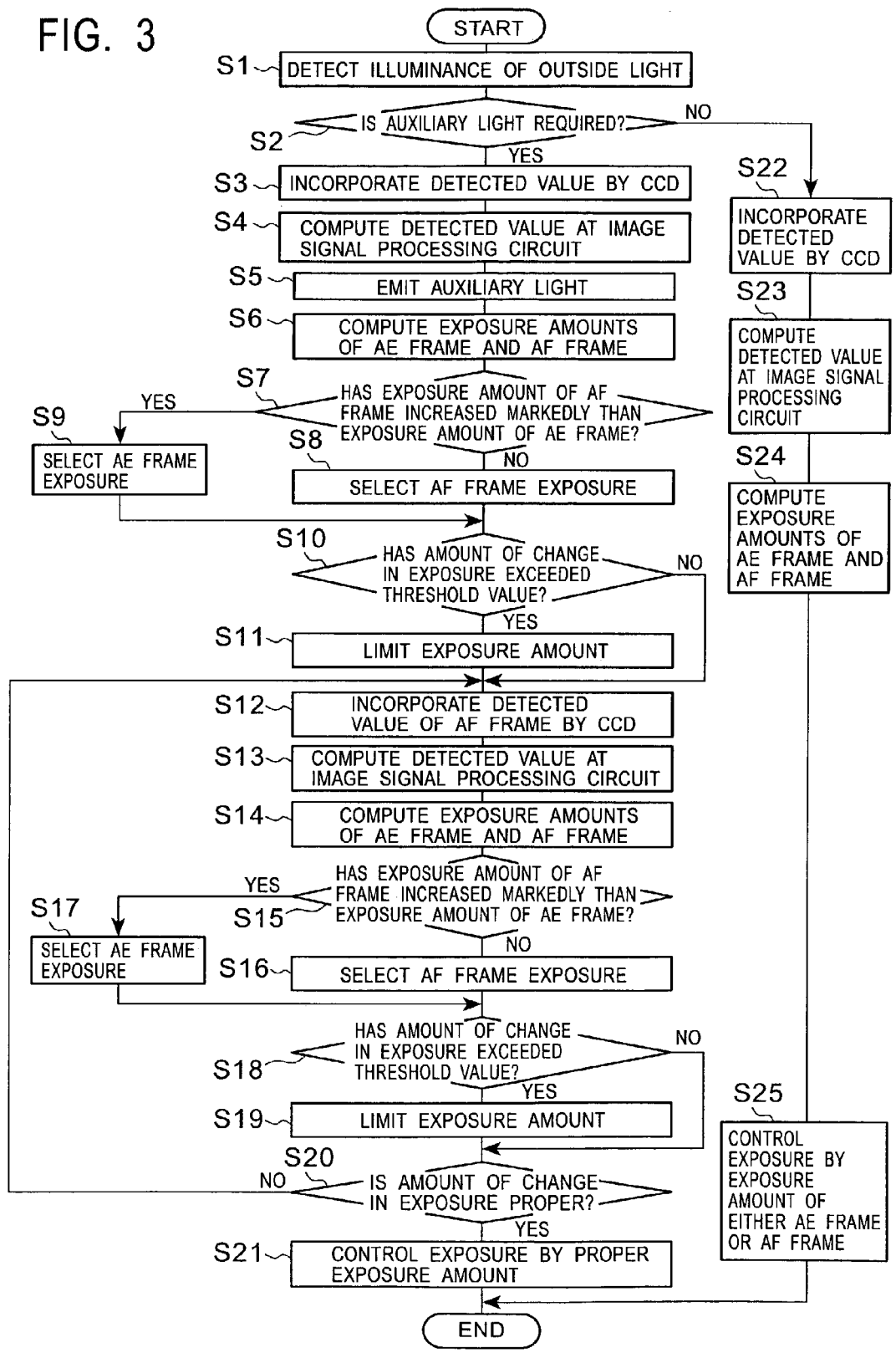

EXPOSURE CONTROL METHOD FOR DIGITAL CAMERA

TECHNICAL FIELD

The present invention relates to an apparatus and method for controlling exposure of a digital camera comprising an auxiliary light emitter for temporarily illuminating an object with auto-focus auxiliary light only during auto-focusing in order to provide light when the luminance level is not sufficient.

BACKGROUND ART

In general, in a digital camera, exposure of an object is controlled by setting the opening ratio of an aperture that is provided at a lens, the electronic shuttering amount of a CCD, which is an imaging device, and the gain of an imaging signal output from the CCD. Many digital cameras use a hill-climbing auto-focusing device as an auto-focusing (hereinafter abbreviated as "AF") device.

Here, auto-focusing means to automatically bring a taking lens into focus with an object. In auto-focusing, the distance to the object is measured to obtain focusing. Hill-climbing auto-focusing provides the principle of measuring distance in auto-focusing in which the location of a lens where a high-frequency component having a luminance level detected by the CCD becomes a maximum is the location of light focus.

Therefore, when an object in a dark background does not have sufficient contrast, the position of the object can no longer be determined, so that the location of light focus cannot be adjusted. To overcome this problem, when there is not sufficient contrast because the luminance level of the object in a dark background is low, auto-focusing is carried out. During the auto-focusing, an exposure controlling operation which increases the gain of an imaging signal is carried out. However, when the luminance level is very low because the object is at a place where there is very little light around it, such as in the dark, the luminance level remains insufficient even if the exposure controlling operation which increases the gain of an imaging signal is carried out, so that it may not be possible to increase the precision of the auto-focusing. To overcome this problem, in recent digital cameras, an object is illuminated with AF auxiliary light in order to provide light when the luminance level is insufficient. In such digital cameras, an auxiliary light emitter for emitting AF auxiliary light is built in the camera body, or is built in a flash unit for illuminating an object to properly expose it when it is photographed in a dark environment or against the sun and is mounted to the camera body when necessary.

Here, the amount of exposure control (opening ratio of an aperture, electronic shuttering amount of a CCD, gain of an imaging signal) is determined by comparing the luminance level of the object with a target value that is stored in RAM, which is a memory that needs to be sequentially subjected to a writing operation, and feeding back the result of the comparison. Therefore, when the luminance level of the object is not a proper level, the amount of exposure control also becomes an improper amount.

In related digital cameras, although the amount of exposure control is updated based on the luminance level while the object is being monitored before photographing it, the amount of exposure control is not updated during auto-focusing. In the case where auxiliary light is emitted, that is, the background is bright, when the luminance level of the object at the time of monitoring and that at the time of auto-focusing are the same, no problems arise even if the amount of exposure control is not updated. However, in the case where the luminance level of the object at the time of monitoring and that at the time of auto-focusing are not the same, when the luminance level of the object at the time of monitoring is used, the exposure is no longer controlled by a proper value. For this reason, in related digital cameras using AF auxiliary light, the precision of auto-focusing cannot be increased. In order to mitigate this problem and perform a proper exposure controlling operation even after emission of auxiliary light, it is necessary to compute the amount of exposure control again by detecting again the luminance level of the object after the emission of auxiliary light.

As mentioned above, when photographing an object with an AF camera using a hill-climbing method, in order to focus an image when it is being photographed, the object needs to have sufficient contrast. There are many situations where the object does not have sufficient contrast, such as when the outline of the object is not clear. When the object cannot have sufficient contrast because its luminance level is low, the image can be focused by increasing the luminance level. In other words, during auto-focusing, an exposure controlling operation which increases the gain of an imaging signal compared to that during monitoring is carried out. When sufficient contrast still cannot be provided due to insufficient luminance level even after this exposure controlling operation has been carried out, the object is illuminated with AF auxiliary light of, for example, an LED, to increase the luminance level of the object for achieving focus. In a camera including an auxiliary light emitter for emitting AF auxiliary light, when the amount of light of the place where the object exists is determined as being low during focusing, a controlling operation is carried out so that auxiliary light is emitted.

In general, the operation modes to the time of recording an image in a digital camera changes from a monitoring mode to a scan AF mode to a photographic mode in that order. Here, the monitoring mode is a mode in which data of an image is displayed on a display section without storing it on a storage medium (in DRAM) to monitor an object.

The scan AF mode is a mode for achieving focus before recording an image. For example, in the scan AF mode, a shutter button is pressed halfway. Here, in order to make it easier to perform AF, the aperture is brought close to an open state and the focal depth is made small. When the luminance level of an object is low, an exposure controlling operation which increases the gain of an imaging signal is carried out to obtain sufficient contrast. The photographic mode is a mode for recording an image.

Conventionally, during monitoring mode, an exposure controlling operation (opening ratio of an aperture, electronic shuttering amount of a CCD, and gain of an imaging signal) is carried out for each frame rate. However, when the operation mode of the camera changes from the monitoring mode to the scan AF mode, an exposure controlling operation is not carried out again in the scan AF mode. Therefore, when auxiliary light is emitted, the amount of exposure control does not change even though the luminance level changes, so that the exposure when auxiliary light is emitted is no longer carried out by a proper amount. This results in a problem in that the precision of the auto-focusing is reduced.

The present invention has been achieved to overcome problems such as those mentioned above, and has as its object the provision of a method for controlling exposure of a digital camera which, by controlling an exposure operation again even after emission of auxiliary light for changing luminance, makes it possible to perform proper exposure even when auxiliary light is emitted, so that the precision of auto-focusing is increased.

DISCLOSURE OF INVENTION

To this end, the present invention provides a method for controlling exposure of a digital camera comprising means for emitting auxiliary light. The method comprises the steps of detecting the illuminance of outside light; determining whether or not the auxiliary light is required based on the detected illuminance of the outside light; prior to emitting the auxiliary light, detecting the luminance level of an object in an AE frame in a monitoring mode under the outside light; after emitting the auxiliary light, detecting again the luminance level of the object in an AF frame in a scan AF mode under the auxiliary light; determining whether or not the exposure amount of the AF frame has increased markedly than the exposure amount of the AE frame; and when it has been determined that the exposure amount of the AF frame has increased markedly in the determining step, performing an exposure controlling operation based on the luminance level in the AE frame, or, when it has been determined that the exposure amount of the AF frame has not increased markedly in the determining step, performing an exposure controlling operation based on the luminance level in the AF frame.

In the present invention, the exposure controlling step comprises controlling the opening ratio of an aperture, the electronic shuttering amount of an imaging device, and the gain of an imaging signal output from the imaging device.

In the method for controlling exposure of a digital camera of the present invention, when the ratio between the exposure amount after the emission of the auxiliary light and the exposure amount prior to the emission of the auxiliary light exceeds a predetermined threshold value, the exposure amount in the AF frame is limited.

According to the present invention, there is provided an exposure controller of a digital camera comprising means for emitting auxiliary light, the exposure controller comprising means for detecting the illuminance of outside light; means for determining whether or not the auxiliary light is required based on the detected illuminance of the outside light; means for detecting the luminance level of an object in an AE frame in a monitoring mode under the outside light prior to emitting the auxiliary light, means for detecting again the luminance level of the object in an AF frame in a scan AF mode under the auxiliary light after emitting the auxiliary light; means for determining whether or not the exposure amount of the AF frame has increased markedly than the exposure amount of the AE frame; and means for performing an exposure controlling operation based on the luminance level in the AE frame when it has been determined that the exposure amount of the AF frame has increased markedly in the determining step, or based on the luminance level in the AF frame when it has been determined that the exposure amount of the AF frame has not increased markedly in the determining step.

In the exposure controller of a digital camera of the present invention, the exposure controlling means controls the opening ratio of an aperture, the electronic shuttering amount of an imaging device, and the gain of an imaging signal output from the imaging device.

In the exposure controller of a digital camera, when the ratio between the exposure amount after the emission of the auxiliary light and the exposure amount prior to the emission of the auxiliary light exceeds a predetermined threshold value, the exposure amount in the AF frame is limited.

BRIEF DESCRIPTION OF THE DRAWINGS

FIG. 2 illustrates a timing of setting the exposure amount when auxiliary light is emitted and not emitted.

FIG. 3 is a flowchart showing the flow of an exposure control operation in a digital camera.

BEST MODE FOR CARRYING OUT THE INVENTION

Figure 1:
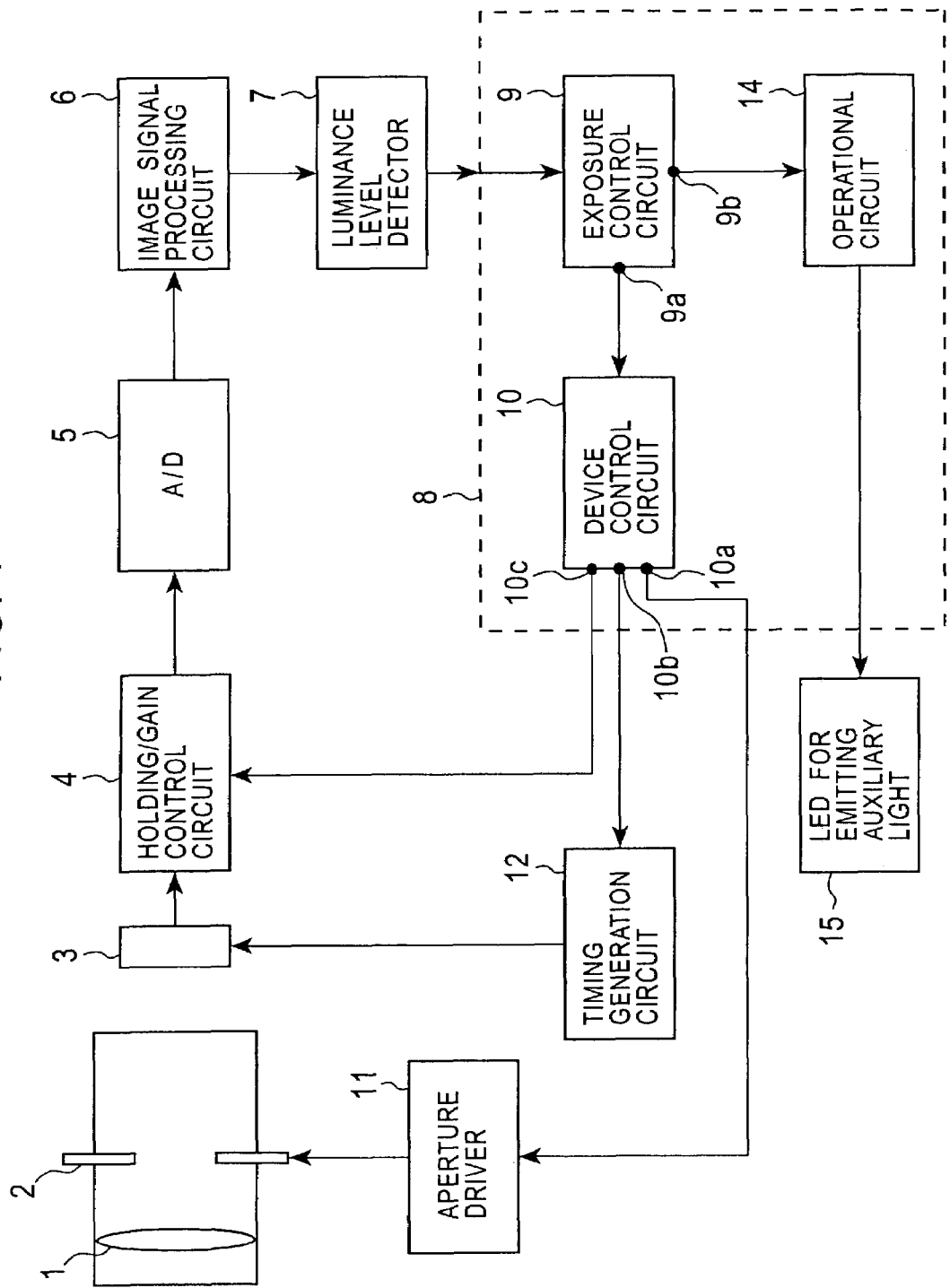
FIG. 1 is a block diagram showing the structure of a circuit of a digital camera control section used in an embodiment of the present invention.

Hereunder, a detailed description of one embodiment of a digital camera of the present invention will be given with reference to the drawings. FIG. 1 is a block diagram showing the structure of a circuit of a digital camera control section used in an embodiment of the present invention.

As shown in FIG. 1, the digital camera of the embodiment comprises a lens 1 for receiving light from an object, an aperture 2 for adjusting exposure, and a CCD 3, which is an imaging device, where a light image of the object from the lens 1 is focused. A holding/gain control circuit 4 which sample holds an imaging signal output from the CCD 3 and which controls the gain of the imaging signal is connected to an output terminal of the CCD 3. An A/D converter 5 for subjecting the imaging signal whose gain has been controlled to analog-to-digital conversion is connected to this holding/gain control circuit 4.

An image signal processing circuit 6 for variously processing the imaging signal is connected to an output terminal of the AD converter 5. A luminance level detector 7 for detecting as a luminance level an integral value of a luminance signal from a predetermined image area and extracted from an image signal is connected to the image signal processing circuit 6.

A microcomputer 8 for controlling the entire operation of the digital camera comprises an exposure control circuit 9, a device control circuit 10, and an operational circuit 14. The exposure control circuit 9 is connected to an output terminal of the luminance level detector 7. Based on the luminance level detected by the luminance level detector 7, the exposure control circuit 9 determines whether or not proper exposure is being carried out. Based on the obtained data on the result of the determination, the exposure control circuit 9 computes control data regarding each device, that is, data on the opening ratio of the aperture 2, data on the electronic shuttering amount of the CCD 3, and gain data from the holding/gain control circuit 4. The exposure control circuit 9 has RAM (not shown). Based on the luminance level detected by the luminance level detector 7, various pieces of data that are required when an exposure controlling operation is carried out are written to RAM. In addition, the various pieces of data are read out from RAM.

The device control circuit 10 for outputting a drive signal of each device is connected to an output terminal 9a of the exposure control circuit 9. An aperture driver 11 is connected to a first output terminal 10a of the device control circuit 10. The aperture 2 is such as to be driven by an output signal from the aperture driver 11. A timing generation circuit 12 for outputting a timing signal that controls the electronic shutter of the CCD 3 is connected to a second output terminal 10b of the device control circuit 10. The holding/gain control circuit 4 is connected to a third output terminal 10c of the device control circuit 10.

The operational circuit 14 is connected to an output terminal 9b of the exposure control circuit 9. From the luminance level, that is, the integral value of a luminance signal from a predetermined image area and extracted from an image signal, computed by the luminance level detector 7, and the control data of each device that is computed based on the luminance level by the exposure control circuit 9, the operational circuit 14 makes a computation to determine whether or not emission of AF auxiliary light is required. An LED 15 for emitting AF auxiliary light is connected to an output terminal of the operational circuit 14, and emits light when necessary.

Next, a description of the exposure controlling operation of the digital camera of the present invention will be given based on the above-described structure. In the embodiment, the exposure controlling operation is considered as being carried out when the luminance level of an object is changed by emitting auxiliary light in the scan AF mode. More specifically, the luminance level changes from monitoring to auto-focusing after emission of auxiliary light. Even at the time of the auto-focusing, the luminance level of the object is detected again (the CCD takes in light) for controlling exposure, thereby increasing the precision of the auto-focusing. Auxiliary light is only emitted when the amount of light of the surrounding is small the luminance level is low, so that it is not emitted when the amount of light of the surrounding is large.

FIG. 2 shows a sequence of the temporal flow of the exposure controlling operation when auxiliary light is emitted.

FIG. 2 illustrates from the top (i) sequence of change in the operation mode of the camera, (ii) on and off states of the LED 15 for emitting auxiliary light, (iii) the CCD 3 takes in (detects) light, (iv) computation at the image signal processing circuit 6, and (v) computation of the exposure amount. Here, each number along the horizontal axis represents frame rate numbers (hereinafter referred to as the "frame numbers"). As shown in FIG. 2, the frame number where the last computation of the exposure amount is carried out in a monitoring mode a1 is 0.

First, detection frames of a liquid crystal display will be described. Since up to frame number 0 the computation of the exposure amount is carried out in the monitoring mode a1, the luminance level is detected at a luminance level detection frame (hereinafter referred to as the "AE frame") that is such as to allow proper exposure during the monitoring mode in order to compute the exposure amount. Here, the AE frame refers to the area of the entire liquid crystal display. Since the computation of the exposure amount from frame number 1 onwards is carried out in a scan AF mode a2, ordinarily, the luminance level is detected at a luminance level detection frame (hereinafter referred to as the "AF frame") that is such as to allow proper exposure during the scan AF mode in order to compute the exposure amount. Here, the AF frame refers to an area of a portion of the screen central portion of the entire area of the liquid crystal display.

When the camera operation mode changes from the monitoring mode a1 to the scan AF mode a2, the detection frame changes from the AE frame to the AF frame as mentioned above. This is because, when auto-focusing is to be carried out, it is necessary to increase the precision of the auto-focusing by previously providing a detection frame which is thought to have a high possibility of having an object in an angle of view and by detecting the luminance level inside the detection frame. In addition, when zooming is carried out, also considering, for example, the range of illumination of the auxiliary light, the AF frame changes to an optimal detection frame for carrying out auto-focusing. However, in the case where the exposure controlling operation is carried out by a suitable exposure amount of the AF frame, when the luminance level of an image increases markedly compared to the luminance level in the monitoring mode, the AE frame is used as the detection frame as in the monitoring mode.

To frame number 1 where the exposure amount is computed immediately after the operation mode has changed to the scan AF mode, operation flows as indicated by arrow A shown in FIG. 2, that is, (iii) the CCD 3 takes in light, (iv) computation is carried out by the image signal processing circuit 6, and (v) by the operation flow indicated by arrow A, the exposure amount is computed based on the luminance level at frame number 1 where the CCD has taken in light {(1) the exposure amount is determined}. For this reason, the exposure amount is computed by the luminance level before auxiliary light is emitted (when auxiliary light is not emitted). In other words, since, at frame number 1 where the exposure amount is computed, the operation mode has already changed to the AF mode, by selecting the AF frame, the luminance level of the object is detected to compute the exposure amount.

The exposure amount computed at frame number 1 is reflected when the CCD has taken in light at frame number 4 (which is shaded) by an operation flow indicated by arrow B shown in FIG. 2 {(2) the exposure amount is reflected}. When the CCD takes in light at frame number 4, auxiliary light has already been emitted, so that, by an operation flow indicated by arrow C, the exposure amount is computed (at frame number 4) {(3) the exposure amount after the emission of auxiliary light is determined}. At this time, since auxiliary light is emitted, the luminance level of an image is increased. At this time, by selecting the AF frame and making a detection, the luminance level is detected to compute the exposure amount.

When the amount of change in the exposure due to the emission of auxiliary light is greater than a predetermined threshold value, the exposure amount is limited so that a sudden change in the luminance level of the image is restricted. This limiting operation is carried out when the amount of change in the exposure exceeds a predetermined threshold value. Here, the predetermined threshold value is previously set in RAM (not shown) in the exposure control circuit 9. By an operation flow indicated by arrow D, the exposure amount that has been computed in this way is reflected at frame number 7 where the CCD takes in light {(4) the exposure amount is reflected}. At frame number 7 where the CCD takes in light, by setting the exposure amount after the emission of auxiliary light, the object has sufficient contrast, so that the precision of the auto-focusing can be increased.

Even if the exposure amount after the emission of auxiliary light is still not the proper value, by repeating these steps, the precision of the exposure is increased, so that the precision of the auto-focusing can be increased even more.

FIG. 3 is a flowchart showing the flow of the steps of the exposure controlling operation of the digital camera.

In FIG. 3, first, the illuminance of outside light is detected by the digital camera (Step S1), and a determination is made as to whether or not auxiliary light is required (Step S2). When it is determined that auxiliary light is required (when the answer is "yes" in Step S2), the CCD takes in a detected value based on the exposure amount that has been computed at a previous frame (Step S3), and the image signal processing circuit 6 makes a computation (Step S4). Thereafter, auxiliary light is emitted (Step S5), and the exposure amounts at the AE frame and the AF frame are computed (Step S6).

Next, in Step S7, a determination is made as to whether or not the exposure amount of the AF frame has markedly increased compared to the exposure amount of the AE frame. When it has been determined that the exposure amount of the AF frame has not markedly increased, "AF frame exposure" is selected (Step S8). When it has been determined that the exposure amount of the AF frame has markedly increased, "AE frame exposure" is selected (Step S9), and the operation proceeds to Step S10. In Step S10, a determination is made as to whether or not the amount of change in the exposure has exceeded a threshold value. When it has been determined that the amount of change in the exposure has exceeded the threshold value, the exposure amount is limited (Step S11). The operation proceeds to Step S12. On the other hand, when it has been determined that the amount of change in the exposure has not exceeded the threshold value in Step S10, the operation proceeds to Step 12 without limiting the exposure amount.

Next, in Step S12, the CCD 3 takes in the detected value of the AF frame, and the image signal processing circuit 6 makes a computation (Step S13). Thereafter, the exposure amounts of the AE frame and the AF frame are computed (Step S14).

Next, in Step S15, a determination is made as to whether or not the exposure amount of the AF frame has markedly increased compared to the exposure amount of the AE frame. When it has been determined that the exposure amount of the AF frame has not markedly increased, "AF frame exposure" is selected (Step S16). When it has been determined that the exposure amount of the AF frame has not markedly increased, "AE frame exposure" is selected (Step S17), and the operation proceeds to Step S18. In Step S18, a determination is made as to whether or not the amount of change in the exposure has exceeded the threshold value. When it has been determined that the amount of change in the exposure has exceeded the threshold value, the exposure amount is limited (Step S19). The operation proceeds to Step S20 to determine whether or not the amount of change in the exposure is a proper amount. On the other hand, when a determination is made that the amount of change in the exposure has not exceeded the threshold value in Step S18, the operation proceeds to Step 20 without limiting the exposure amount.

In Step S20, when the amount of change in the exposure is not the proper amount, the operation returns to Step S12, and the Steps S12 to S20 are repeated. In Step S20, when the amount of change in the exposure is the proper amount, a proper exposure controlling operation is carried out in Step S21 based on the exposure amount obtained in Step S14.

On the other hand, when it is determined that auxiliary light is not required (when the answer is "no" in Step S2), the CCD 3 takes in a detected value (Step S22), and the image signal processing circuit 6 makes a computation (Step S23). Thereafter, the exposure amount of the AE frame and the exposure amount of the AF frame are computed (Step S24), and, based on the exposure amounts obtained in Step S24, the exposure controlling operation is carried out (Step S25).

As described in detail above, according to the present invention, auxiliary light is emitted during auto-focusing to detect the luminance level of an object. Based on the luminance level, the exposure amount is determined. Based on the exposure amount, the exposure controlling operation is carried out. Therefore, the exposure controlling operation is properly carried out, so that the precision of the auto-focusing can be increased.

In addition, according to the present invention, auxiliary light is emitted during auto-focusing to detect the luminance level of an object. Based on the luminance level, the exposure amount is determined. Based on the exposure amount, the exposure controlling operation is carried out. Therefore, pictures can be taken in dark places.

Further, according to the present invention, a determination is made as to whether or not the exposure amount of the AF frame has markedly increased than the exposure amount of the AE frame. When it is determined that it has markedly increased in the determining step, the exposure controlling operation is carried out based on the luminance level of the AE frame. Therefore, it is possible to carry out the exposure controlling operation without putting the camera in the scan AF mode, so that the exposure controlling operation can be quickly carried out.

When auto-focusing is carried out, auxiliary light is emitted to detect the luminance level of an object. Therefore, even if a user intentionally sets the exposure amount outside the range of proper exposure amounts in, for example, manual mode, the user can effectively carry out auto-focusing by detecting the luminance level of the object again.

The invention claimed is:

1. A method for controlling exposure of a digital camera comprising means for emitting auxiliary light, the method comprising the steps of:
   detecting the illuminance of outside light;
   determining whether or not the auxiliary light is required based on the detected illuminance of the outside light;
   prior to emitting the auxiliary light, detecting the luminance level of an object in an AE frame in a monitoring mode under the outside light;
   after emitting the auxiliary light, detecting again the luminance level of the object in an AF frame in a scan AF mode under the auxiliary light;
   determining whether or not the exposure amount of the AF frame has increased markedly than the exposure amount of the AE frame; and
   when it has been determined that the exposure amount of the AF frame has increased markedly in the determining step, performing an exposure controlling operation based on the luminance level in the AE frame, or, when it has been determined that the exposure amount of the AF frame has not increased markedly in the determining step, performing an exposure controlling operation based on the luminance level in the AF frame.

2. A method for controlling exposure of a digital camera according to claim 1, wherein the exposure controlling step comprises controlling the opening ratio of an aperture, the electronic shuttering amount of an imaging device, and the gain of an imaging signal output from the imaging device.

3. A method for controlling exposure of a digital camera according to claim 1, wherein, when the ratio between the exposure amount after the emission of the auxiliary light and the exposure amount prior to the emission of the auxiliary light exceeds a predetermined threshold value, the exposure amount in the AF frame is limited.

4. An exposure controller of a digital camera comprising means for emitting auxiliary light, the exposure controller comprising:

means for detecting the illuminance of outside light;

means for determining whether or not the auxiliary light is required based on the detected illuminance of the outside light;

means for detecting the luminance level of an object in an AE frame in a monitoring mode under the outside light prior to emitting the auxiliary light, and for detecting again the luminance level of the object in an AF frame in a scan AF mode under the auxiliary light after emitting the auxiliary light;

means for determining whether or not the exposure amount of the AF frame has increased markedly than the exposure amount of the AE frame; and means for performing an exposure controlling operation based on the luminance level in the AE frame when it has been determined that the exposure amount of the AF frame has increased markedly in the determining step, or based on the luminance level in the AF frame when it has been determined that the exposure amount of the AF frame has not increased markedly in the determining step.

5. An exposure controller of a digital camera according to claim 4, wherein the exposure controlling means controls the opening ratio of an aperture, the electronic shuttering amount of an imaging device, and the gain of an imaging signal output from the imaging device.

6. An exposure controller of a digital camera according to claim 4, wherein, when the ratio between the exposure amount after the emission of the auxiliary light and the exposure amount prior to the emission of the auxiliary light exceeds a predetermined threshold value, the exposure amount in the AF frame is limited.

* * * * *